Patented Nov. 19, 1929

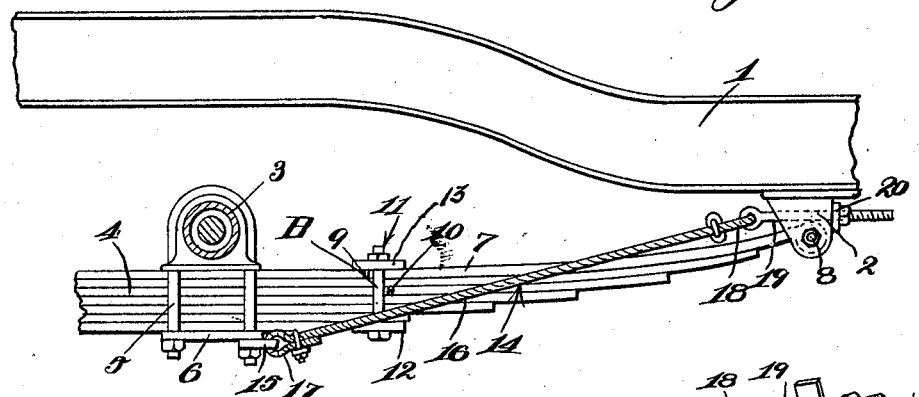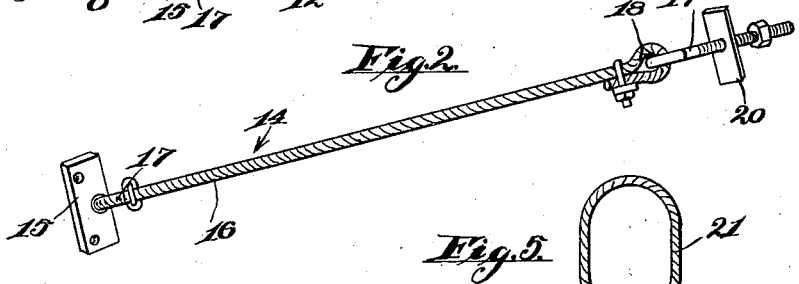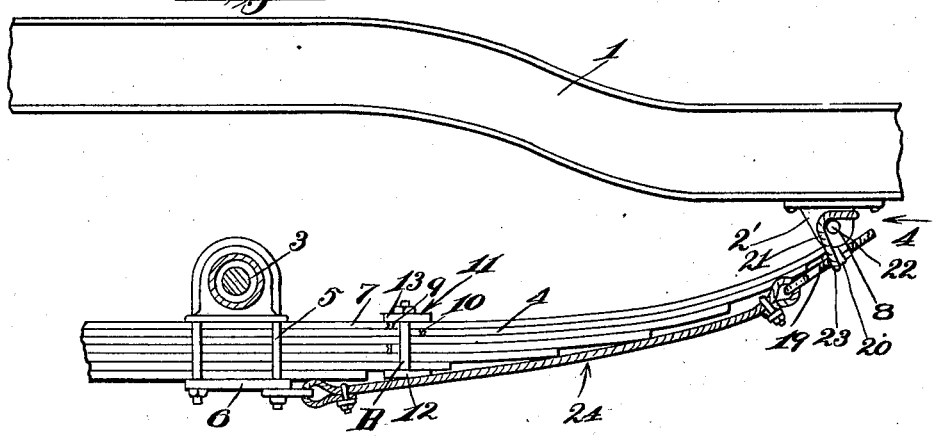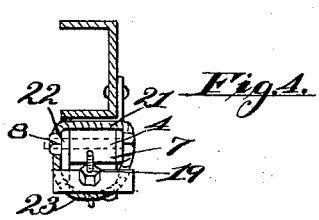

1,736,113

UNITED STATES PATENT OFFICE

KENT B. DOTSON, OF LOS ANGELES, CALIFORNIA

TEMPORARY BROKEN-SPRING SUPPORT FOR MOTOR VEHICLES

Application filed August 17, 1926. Serial No. 129,709.

My invention is a temporary broken spring support for motor vehicles, particularly adapted to support the springs in which a driving force is transmitted from an axle to the frame of the car through the springs instead of through radius rods or the like.

An object of my invention is to clamp the spring structure adjacent an axle and a part of the vehicle frame to which the free end of the spring is connected by a flexible connecting device, so that broken springs will be sufficiently secured between the axle and the vehicle to permit continued travel.

In utilizing my invention I use a clamp which secures the broken leaves of a multiple spring together and has a flexible cable with means to attach same to the spring clamp or the like adjacent the spring axle and having means to secure the other end of the cable to the spring bracket or the like attached to the frame of a vehicle.

My invention is illustrated in the following drawings, in which:

Figure 1 is a side elevation view of the manner of attaching my invention,

Fig. 2 is a perspective view of the temporary support detached from the vehicle, Fig. 3 is a side elevation of a part of a vehicle showing another form of my attachment for a broken spring.

Fig. 4 is a partial front elevation taken in the direction of the arrow 4 of Fig. 3, and Fig. 5 is a view of a flexible loop to be attached to the spring bracket on the frame.

In the drawings the frame of the vehicle is designated by the numeral 1, this being usually a channel having a bracket 2 attached thereto. The vehicle axle is designated by the numeral 3 and has a spring 4 clamped thereto by U-shaped bolts 5 and clamping plates 6. In this construction of spring the main leaf 7 is attached to a pin 8 or the like which passes through the bracket 2. In the drawings the leaves of the spring are indicated as being broken at the places 9 and 10.

In order to make a temporary repair a clamp designated generally by the numeral 11 and comprising lower and upper plates 12 and 13 secured by bolts B is placed over the leaves of the spring, preferably as close to the break as possible. My flexible support designated by the numeral 14 is connected between the U-bolts 5 and the bracket 2. This supporting device comprises a plate 15 having apertures therethrough to be secured to the bolts 5 and having a cable 16 with an eye 17 attaching same to the plate. An eye 18 is formed at the other end of the cable and this engages in the eye of the tightening bolt 19, this bolt having a plate 20, which plate fits in front of the bracket 2, and by means of this nut on the bolt, it is tightened until there is sufficient tension on the cable to hold the broken and abutting ends of the leaves of the spring in firm relation one to the other and to clamp the spring sufficiently tightly so that the vehicle may be used until permanent repairs can be made.

The construction shown in Figs. 3, 4 and 5 is used where the brackets 2' are of such small size that the bolt 19 cannot be placed through same between the frame and the pin 8. In this arrangement the flexible loop 21 is fitted over the front 22 of the bracket 2' and is hooked over the pin 8, the free end of the loop 23 being suspended below the bracket. The plate 20 bears on the side of the loop opposite the axle, the bolt 19 passing through the loop and through the plate with the nut screwed down on the plate exerting tension on the cable. It will be noted that in this construction the cable bears against the lower surface of the spring, as indicated by the numeral 24 and follows the contour of the spring.

While I have illustrated my temporary support for broken springs as being connected between the clamp which secures the spring to the axle and a bracket on the vehicle frame, it is nevertheless obvious that the device could be connected to a swinging shackle or the like, and, if desired, could be connected from one end of the spring to the other. It is also manifest that the supporting device may be connected to the springs in different manners according to the construction of the spring in order that the flexible supporting device may have a tension exerted thereon and thereby the flexible supporting device exert a compressive stress on the leaves of the spring.

It will be manifest therefore that my invention may be considerably changed in general construction and in specific details to adapt same to different circumstances and uses, such changes being within the spirit of my invention as set forth in the description, drawing and claims.

I claim:

1. A spring support comprising, in combination, a vehicle frame having a bracket, an axle, a spring, bolts securing the same to the axle, means securing another part of the spring to the bracket, a flexible loop secured to the bracket, a cable having a plate secured to the bolts, a tightening bolt on the other end of the cable, and means engaging said bolt and the flexible loop.

2. A spring support comprising in combination a vehicle frame having a bracket, an axle, a spring securing device for attaching the spring to the axle and to the bracket, a flexible cable having one end attached to a plate, the other end of the cable having a directly connected threaded bolt, means to rigidly engage the plate and the bolt to the devices securing the spring to the axle and to the bracket, respectively, the said cable being adapted to extend along the side of the spring or to extend along the lower surface of the spring.

3. A spring support comprising in combination a vehicle frame having a bracket, an axle, spring bolts securing the spring to the axle, means securing another part of the spring to the bracket, a flexible cable having a plate at one end, the said plate being rigidly secured to one of the bolts attaching the spring to the axle, a threaded bolt directly connected to the other end of the cable, and means to connect the threaded bolt to the bracket, the said cable being adapted to pass along the side of the spring or to follow the lower surface of the spring.

4. A spring support comprising in combination a vehicle frame having a bracket, an axle, spring bolts securing the spring to the axle, means securing another part of the spring to the bracket, a flexible cable having a plate secured to one end, said plate being rigidly attached to one of the bolts securing the spring and the axle, a threaded bolt directly attached to the other end of the cable, a plate threaded on said bolt and means to connect the plate to the bracket and exert a tension on the bolt and on the cable, the said cable being adapted to pass along one side of the spring or to follow the contour of the lower surface of the spring.

In testimony whereof I have signed my name to this specification.

K. B. DOTSON.